REMOTE CONTROL VOTING SYSTEM

Filed Dec. 26, 1968 2 Sheets-Sheet 1

INVENTORS
FRED C. TRICE
FRANK F. FLOHR
KARL S. HESCH
ALVARO GARCIA
BY Eugene F. Malin
ATTORNEY INVENTORS
FRED C. TRICE
FRANK F. FLOHR
KARL S. HESCH
ALVARO GARCIA
BY
Eugene F. [signature]
ATTORNEY United States Patent Office 3,525,811
Patented Aug. 25, 1970

3,525,811
REMOTE CONTROL VOTING SYSTEM

Fred C. Trice, 3831 NE. 22 Way, Lighthouse Point, Fla. 33064; Frank F. Flohr, 2520 NE. 48 Center, Pompano Beach, Fla. 33064; Karl S. Hesch, 1913 S. Ocean Drive, Hallandale, Fla. 33009; and Alvaro Garcia, 180 N. Glen Drive, Rochester, N.Y. 14626

Filed Dec. 26, 1968, Ser. No. 786,909
Int. Cl. G07c *13/00*; G101 *1/00*
U.S. Cl. 179—1 9 Claims

ABSTRACT OF THE DISCLOSURE

A remote control voting system including a connecting system between remote voters and a polling place, a switchboard connected to the remote voters for regulating the inflow and outflow of data at the poll, and a director for regulating the flow of data to signal converters, verification means, and voting tabulation means. The verification means includes an information retrieval system and a comparator for verifying the identity of the voter by code number and voice print. The voting tabulation means receives and tabulates votes from identified voters.

BACKGROUND OF THE INVENTION

This invention relates to a remote control voting system for receiving remote signals from each voter at a polling location, verifying the identity of each remote voter, and tabulating the votes cast by the identified voter. And, more particularly, to a remote control voting system including a communication system between each voter at remote locations and the polling place, a switchboard at the poll for regulating the inflow and outflow of data, a director connected to the switchboard for regulating the flow of data at the poll, a verification means for verifying the indentity of each remote voter by code number and voice print identification, and a voting tabulation means for receiving and tabulating votes cast by each identified voter.

As is perhaps well-known, a variety of voting systems have been devised and used throughout history. The operable voting systems require the voters to be present at the polling place in order to insure proper identification of each voter. Such systems attempted to prevent mass voting frauds. Various paper balloting systems and mechanical voting machine systems have been used for many years. In the past, telephonic communications have been used for many types of business transactions. Telephonic verification systems have been devised to attempt to identify a caller. The verification systems identity the caller as the person having possession of a particular code number. Such verification systems do not verify the identity of the particular person calling by telephone.

SUMMARY OF THE INVENTION

The present invention relates to a new and improved remote voting system. In the preferred embodiment, the remote voting system includes a communication system to connect remote voters to a particular polling place, a switchboard located at the polling place for regulating the inflow and outflow of signals between each remote voter and the polling place, a director for regulating signal traffic between the switchboard, signal converters, a verification system, and a voting tabulation system. The verification system includes an information retrieval system and comparators for identifying each remote voter. The tabulating means receives and tabulates votes from identified voters.

An object of this invention is to provide a voting system with a voice pattern verification system;

Another object of this invention is to provide a remote voting system that verifies the identity of each voter accurately, economically and effectively.

A further object of this invention is to provide a remote voting system with a dual verification system to identify a voter by code number and voice print;

An additional object of this invention is to provide a non-complex remote control voting system for identifying each remote voter and thereafter accepting and tabulating the vote of the identified voter.

In accordance with these and other objects which will be apparent hereinafter, the instant invention will now be described with particular reference to the accompanying drawings.

DESCRIPTION OF THE PREFERRED EMBODIMENT

Figure 1:
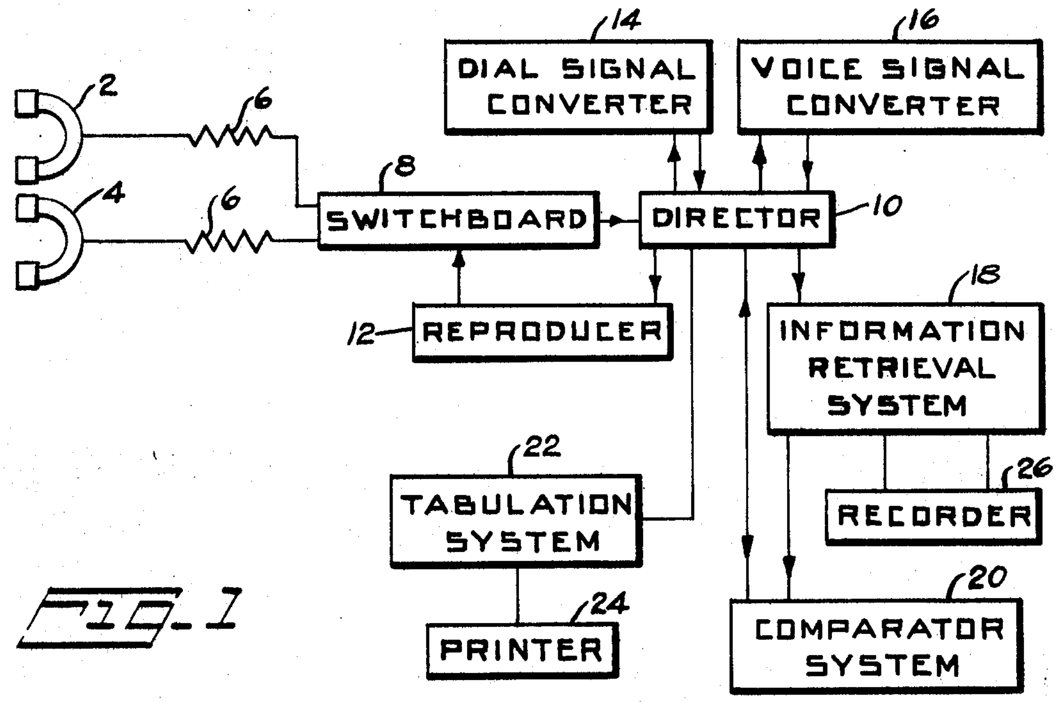
FIG. 1 is a block diagram of the remote voting system.

Referring now in detail to the drawing, wherein an embodiment of the remote voting system is shown, and referring, particularly to FIG. 1, various remote voting stations, generally designated as numerals 2 and 4, are connected to a telephonic communication system 6 in order to connect each remote voter to a polling location. The communication system 6, shown as a telephonic communication system, is connected to switchboard 8 for regulating the inflow and outflow of data at the poll. The switchboard 8 is connected to a director 10 that regulates the flow of data to a reproducer system 12, dial signal converter 14, a voice signal converter 16, an information retrieval system 18, comparator system 20, and voting tabulation system 22. The verification portion of the system is utilized to identify each other. The verification system includes the information retrieval system 18 and comparator system 20. The tabulation system 22 receives and stores each vote cast by an identified voter and thereafter tabulates and prints the voting results with printer 24.

Figure 2:
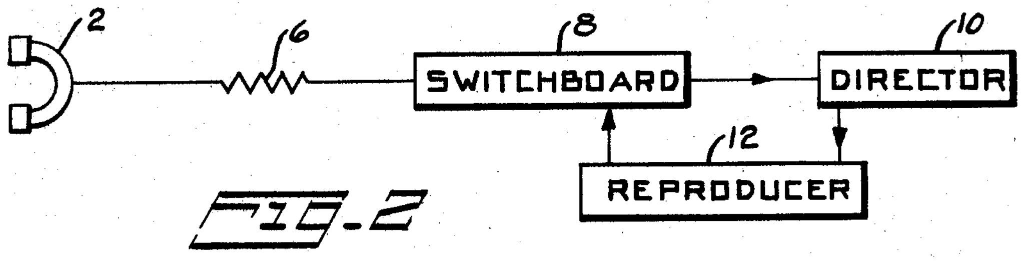
FIG. 2 is a representation of the remote voter connected to the poll.

In operation, as shown in FIG. 2, a remote voter is connected to the polling location by a communication system. The communication may be a telephonic system, radio transmitting and receiving system, or other known communication means. When a call is placed from the remote telephone station 2 and connected to the switchboard 8 by the telephonic communication system 6, the voter is placed in contact with the director 10. Once a proper connection is made between the remote telephone station 2 and the director 10, the director assigns a system code number to that particular connection and signals the reproducer system 12 that a proper connection has been made. This code number becomes part of all subsequent message transmissions throughout the individual voting operation in order to assure complete accuracy and to obtain maximum use out of the remote voting equipment at the polling place. Any well known device or director may be used to coordinate each operation in the remote voting system. After the director signals the reproducer 12 that a proper connection has been made with the poll, the reproducer 12 produces an audio voice communication with the remote voter informing the voter that a proper connection has been made with a particular polling place. The reproducer 12 then instructs the voter as to the next step to be completed in the voting operation. The remote voter is instructed to relay his voter's registration number.

Figure 3:
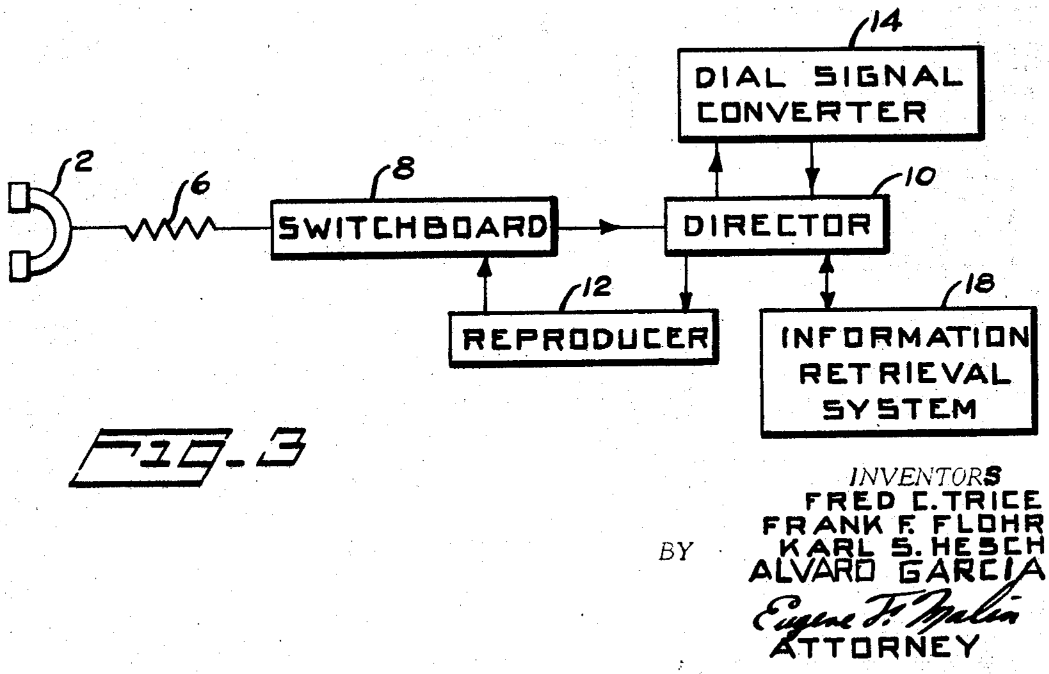
FIG. 3 is a representation of the remote voter connected to stored voter registration data.

Referring now to FIG. 3, the remote voter at the remote telephone station 2 dials his voter's registration number into the system. This number may be sent by dialing, by touch tone, or by other known means for communicating numbers through various communication systems. The registration number is sent over a telephone communication system 6 to switchboard 8. Switchboard 8 places the registration number in the director 10. The call is identified by the system code number. The input is forwarded to the dial signal converter 14. The input is processed in the dial signal converter into a digital signal or other language for processing in the information retrieval system. The processed signal is transmitted to the director 10 and from the director 10 to the information retrieval system 18. The information retrieval system searches for the particular voter's record stored in a storage system. If no record is found or a record is found but said record indicates that the voter has already voted, the information retrieval system will signal the director to signal the reproducer 12 in order to actuate the reproducer to inform the voter of the particular fact that excludes him from voting. The reproducer 12 will inform the voter that his records are not at the particular polling place or his records are present but his records show that he has already voted. The reproducer may also advise the voter to call a voter assistance number if aid is desired. When a record is found that shows the voter has not previously voted in this particular election, the reproducer 12 will be actuated to inform the voter that his record has been found and that he should now transmit his secret code number for comparison with the stored secret code number in the remote voting system.

Figure 4:
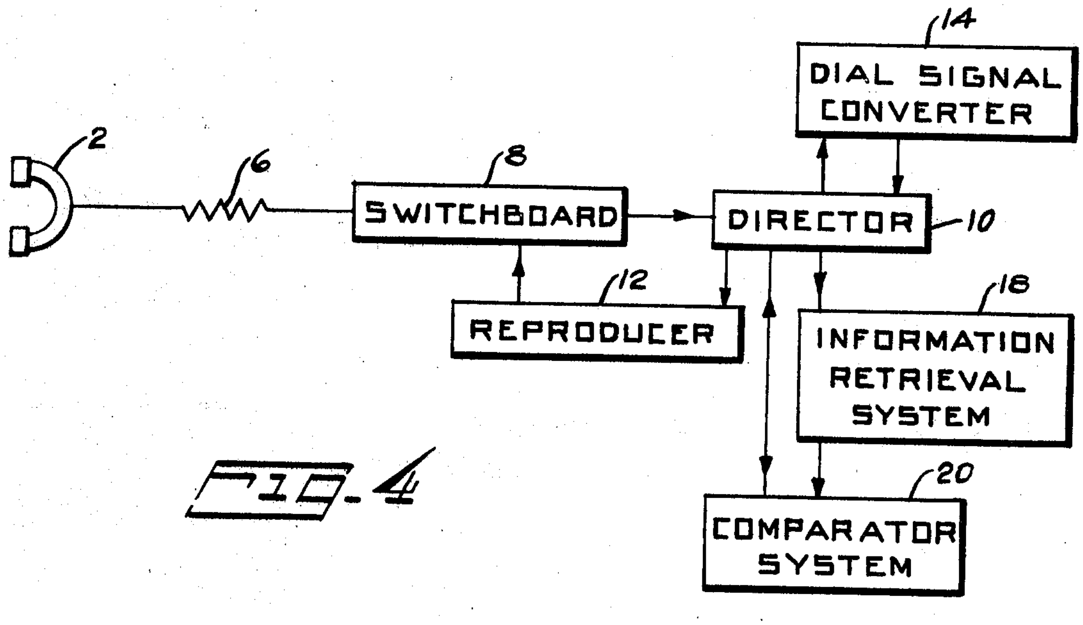
FIG. 4 is a representation of the remote voter processing a code number in the verification system.

Referring now to FIG. 4, the remote voter at remote station 2 transmits his secret code number by dialing methods, by touch tone methods, or other known methods. The secret code number signal is transmitted through the communication system 6 and switchboard 8 to director 10. The transmitted signal is forwarded to the dial signal converter 14 in order to convert the input signal into digital form by well known means. The dial signal converter 14 sends the digital signal through director 10 to the comparator system 20. The director also actuates the information retrieval system 18 forwarding the stored secret code number in digital form to the comparator system for comparison with the voter's secret code number. The comparator system 20 will indicate whether or not the voter's secret code number is the same as the stored secret code number. This result if forwarded through the director 10 to reproducer 12 to actuate a voice communication with the voter. The communication informs the voter that a comparison has been made and that the voter should now transmit a voice communication for voice print identification, or that a comparison has not been made and that the voter should contact an information center if aid is desired. The system may also include an alarm system to be actuated when a comparison fails. The alarm system may inform authorities that a party is trying to cast a vote without the proper credentials.

Figure 5:
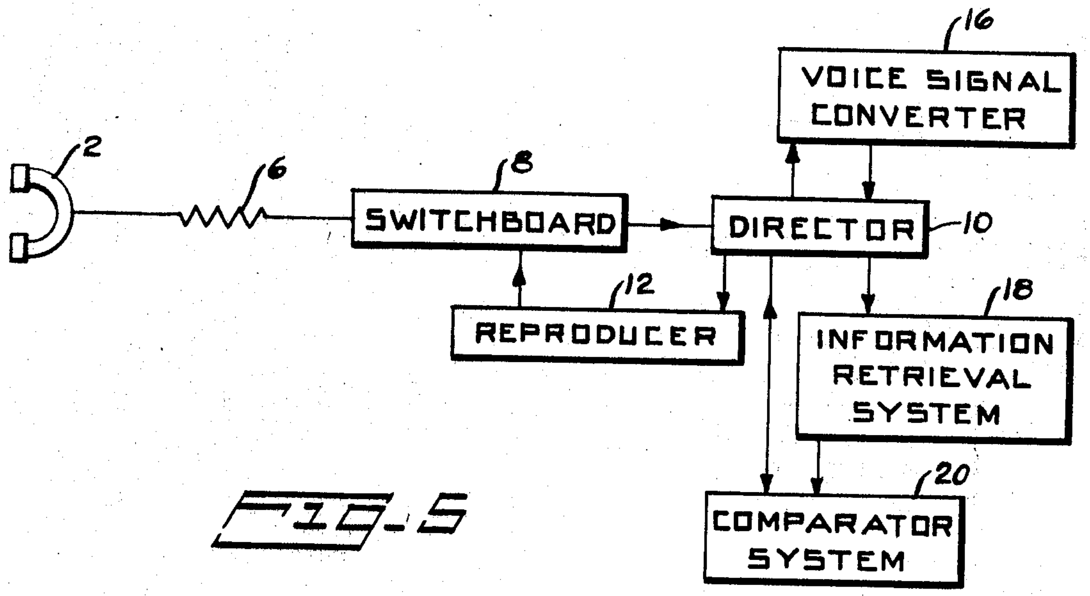
FIG. 5 is a representation of the remote voter processing a voice communication in the verification system.

Referring now to FIG. 5, the remote voter sends a voice communication from remote station 2 through the telephone communication system 6 and switchboard 8 to director 10. The director forwards the voice communication into the voice signal converter 16. The voice signal converter 16 converts the signal into digital voice print information. The digital information is transferred back through the director 10 to the comparator system 20. The director also actuates the information retrieval system 18 in order to forward the stored digital voice print information to the comparator 20. The comparator compares the stored voice print information with the voters transmitted voice print information. The comparator will indicate whether or not the two voice prints match. The result is forwarded through the director 10 to the reproducer 20. The voter is then informed that either a comparison has not been made and that he should communicate with an information center, or that a comparison has been made and the voter is identified and he should now cast his vote from the remote station 2. The vote may be cast by either dial, touch tone or station 2.

A remote voter at station 2, as shown in FIG. 1, may then cast his vote through the communication system 6 and the switchboard 8 to director 10. The director forwards the transmitted information to the dial signal converter 14 to convert the voting information into digital form. The digital vote is transmitted through the director to the voting tabulation system 22. The vote is tabulated and stored in tabulation system 22. When the voter casts his vote the director is actuated to transmit a signal through the information retrieval system 18 into a recording system 26 to indicate and record a signal on the particular voter's registration record in the information retrieval memory bank that indicates said voter has voted in this particular election and is ineligible to vote again in this particular election. The tabulation system will be connected to a printer 24 to print the results of the votes cast when called for. The printer 24 may also print out information related to the voters that have not voted at a given demand signal. Once the vote has been completed the director transmits a disconnect signal in order to disconnect the particular remote voter from the system and the assigned code number.

The voice signal converter 16 includes a sound spectrogram analyzer (not shown) that is capable of analyzing any time varying signal automatically. Existing spectrogram analyzers are capable of repeatedly scanning the magnetically recorded signal for each analysis. As is perhaps well known, a band-shift modulation system may be used to select a different narrow band of frequencies each time the signal is scanned. Normally the amplitude information of successive frequency bands is marked on a visual display to present a visual display of frequency and amplitude as a function of time. In this particular invention a visual display need not be presented unless voice print data is to be compared visually. The various parameter information relating to the frequencies and amplitudes as a function of time are collected in digital form and are used directly in a comparator to identify a particular voice.

Contour spectrogram analysis lends itself to automated computer programming. Automated analysis and print out of time, frequency and amplitude parameters are possible with a wide variety of computers. In voice print identification, automatic classification and identification selection are readily available with the present state of the spectrogram analyzer art. The parameter data is transferred to the comparator in digital form for comparison with the stored voice print data in digital form.

The accuracy of voice print identification is based on the individual's sound-producing body members. That is, the throat, mouth, sinus, nose, lips, teeth, tongue and other coordinating tissues. The variety of elements that influence vocal sound by an individual are numerous and therefore the chance of two individuals producing a same voice pattern is highly remote.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What we claim is:

1. A remote control voting system comprising, at least one remote voting station, a communication system connected to said voting station, a director connected to said communication system for regulating the flow of data at a polling place, a signal converter connected to said director for converting input signals to verify the identity of a voter at the remote station, a verification system connected to said director for verifying the identity of the signal from the voter at remote voting station, and voting tabulation system connected to said signal converter for recording votes cast by an identified voter.

2. A remote control voting system as set forth in claim 1, wherein:

said verification system includes a memory bank for storing voter identification data, and a comparator for comparing the stored voter identification data with the input data from the voter.

3. A remote control voting system as set forth in claim 1, wherein:

said signal converter is a voice signal converter including a voice print identification means for supplying voice print data to a comparator, and said verification system includes a memory bank for storing voice print identification data from each registered voter and a comparator for comparing the stored voice print identification data with the voter's voice print identification data to identify the voter prior to recording his vote.

4. A remote control voting system as set forth in claim 3, including:

a second signal converter for code number signal inputs, and wherein, said memory bank stores identification and other data from each registered voter, and said comparator compares stored code number identification data with code number inputs for identifying the voter.

5. A remote control voting system comprising, at least one remote voter station, a switchboard for regulating the inflow and outflow of data between a polling place and voters at remote locations, a connecting system connected between the remote voter station and said switchboard, a director connected to the switchboard for regulating the flow of data at the polling place, a voice signal converter connected to said director for converting input voice print identification data into component form for comparison with stored voice print identification data, said voice signal converter including a voice spectrographic system for collecting voice print data, reading said data, and transmitting the converted input, a verification system connected to said director said verification system including, an information retrieval system with a memory system including a memory bank for storing identification and other data for each registered voter, and comparator system for comparing the stored voice print data with the input voice print data, and a tabulating system connected to said remote voting station for recording and tabulating votes from only identified voters.

6. A remote control voting system as set forth in claim 5, including:

a code number signal converter connected to said director for converting numerical code inputs for comparison with stored code numbers in said comparator.

7. A remote control voting system as set forth in claim 6, including:

a reproducing system for automatically directing a remote voter in the voting operation.

8. A remote control voting system as set forth in claim 7, including:

a printer connected to said tabulating system for printing voting results cast.

9. A method of voting from remote locations in which, a registration signal is transmitted over a communication system to a polling place from a remote location, converting the registration signal in order to locate stored data in a memory system that pertains to the calling voter, a voice communication is then transmitted over the communication system to a voice print signal converter, a comparison of the converted voice print signal with a stored voice print signal of the voter to identify the calling voter, and transmitting, receiving and tabulating the vote cast by each identified voter.

References Cited

UNITED STATES PATENTS

| | | | |
|---|---|---|---|
| 3,227,364 | 1/1966 | Clark | 235—50 |
| 3,466,394 | 9/1969 | French. | |

KATHLEEN H. CLAFFY, Primary Examiner

C. JIRAUCH, Assistant Examiner

U.S. Cl. X.R.

235—50, 51